US009467392B2

(12) United States Patent
Hrabak et al.

(10) Patent No.: US 9,467,392 B2
(45) Date of Patent: Oct. 11, 2016

(54) COMMUNICATION IDENTIFICATION BETWEEN PORTABLE ELECTRONIC DEVICES AND A MOTOR VEHICLE

(71) Applicant: GM Global Technology Operations LLC, Detroit, MI (US)

(72) Inventors: Robert A. Hrabak, West Bloomfield, MI (US); Wen Gu, Sterling Heights, MI (US); Lakshmi V. Thanayankizil, Rochester Hills, MI (US); David P. Pop, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/632,957

(22) Filed: Feb. 26, 2015

(65) Prior Publication Data

US 2016/0255015 A1 Sep. 1, 2016

(51) Int. Cl.
| | |
|---|---|
| *H04B 7/00* | (2006.01) |
| *H04L 12/927* | (2013.01) |
| *H04W 76/02* | (2009.01) |
| *H04W 4/00* | (2009.01) |
| *H04L 29/08* | (2006.01) |
| *H04L 29/06* | (2006.01) |

(52) U.S. Cl.
CPC ......... *H04L 47/805* (2013.01); *H04L 65/1069* (2013.01); *H04L 67/12* (2013.01); *H04W 4/008* (2013.01); *H04W 76/023* (2013.01); *H04W 76/025* (2013.01); *H04W 76/027* (2013.01)

(58) Field of Classification Search
CPC ............. H04W 4/008; H04W 76/023; H04W 76/0025; H04W 76/027
USPC .......................... 455/41.1, 41.2, 569.2, 575.9
See application file for complete search history.

(56) References Cited

U.S. PATENT DOCUMENTS

| | | | | |
|---|---|---|---|---|
| 9,154,905 | B2 * | 10/2015 | Sakata | ................... B60R 25/00 |
| 2007/0238475 | A1 * | 10/2007 | Goedken | ............. H04M 1/7253 455/512 |
| 2013/0288606 | A1 * | 10/2013 | Kirsch | ................ H04M 1/6091 455/41.3 |

* cited by examiner

*Primary Examiner* — Tuan Pham
(74) *Attorney, Agent, or Firm* — Christopher DeVries; Reising Ethington P.C.

(57) ABSTRACT

A method for initiating a projection session between one of a plurality devices and an infotainment system of a motor vehicle includes establishing communications with each of the plurality of mobile devices. Each of the plurality of devices is identified against a predetermined priority, such that each of the plurality of devices identified with a predetermined priority is assigned the predetermined priority. Each of the plurality of devices is prioritized from the highest to lowest based on the predetermined priority. A user configuration of the one of the plurality of devices with the highest priority is red. A connection between the one of the plurality of devices with the highest priority and the infotainment system of the motor vehicle is attempted. A communication session between the one of the plurality of devices with the highest priority and the infotainment system of the motor vehicle is then established.

11 Claims, 6 Drawing Sheets

*Figure 3A*

| Priority | Device Name | Use Bluetooth? | Use Projection? | Supported Projection Technology |
|---|---|---|---|---|
| 3 | Robert's iPhone | x | | Apple CarPlay |
| 1 | Wen's Galaxy S4 | | x | MirrorLink |
| 2 | Karen's iPhone 6 Plus | | x | Apple CarPlay |
| 4 | Nexus 6 | | x | Android Auto |
| 5 | Nexus 5 | x | | Android Auto |
| 6 | John's RAZR | x | | |
| 8 | Rob's HTC One | x | | MirrorLink |
| 7 | Lakshmi's Motorola | x | | |

COMMUNICATION IDENTIFICATION BETWEEN PORTABLE ELECTRONIC DEVICES AND A MOTOR VEHICLE

TECHNICAL FIELD

The present invention relates to a method for communication between an infotainment system within a motor vehicle and one of a plurality of electronic devices.

BACKGROUND

Smart phones and tablets have made the internet, information and entertainment available to users anywhere at any time. Users of these devices expect them to interface with infotainment systems built into motor vehicles. More than one occupant of the passenger compartment may have a mobile device and all of the mobile devices may attempt to communicate with the infotainment system. Compounding this communications issue is the fact that any one occupant within a motor vehicle may have one or more of these devices.

Problems occur when there are multiple devices within a passenger compartment of a motor vehicle that are attempting to communicate wirelessly with the infotainment system. Some devices are faster than others, which creates a type of race to connect to the infotainment system.

SUMMARY

According to an embodiment of the invention, there is provided a method for initiating a projection session between one of a plurality devices and an infotainment system of a motor vehicle. The method includes establishing communications with each of the plurality of mobile devices. Each of the plurality of devices is identified against a predetermined priority, such that each of the plurality of devices identified with a predetermined priority is assigned the predetermined priority. Each of the plurality of devices is prioritized from the highest to lowest based on the predetermined priority. A user configuration of the one of the plurality of devices with the highest priority is read. A connection between the one of the plurality of devices with the highest priority and the infotainment system of the motor vehicle is attempted. A communication session between the one of the plurality of devices with the highest priority and the infotainment system of the motor vehicle is then established.

BRIEF DESCRIPTION OF THE DRAWINGS

One or more embodiments of the invention will hereinafter be described in conjunction with the appended drawings, wherein like designations denote like elements, and wherein:

FIG. 3A is a table of exemplary mobile devices that may be found within a passenger compartment of the motor vehicle;

DETAILED DESCRIPTION OF THE ILLUSTRATED EMBODIMENT(S)

The method described below details how communication between an infotainment system and one of a plurality of mobile devices present within the passenger compartment of the motor vehicle may be established. This communication is established in a way that meets the needs of the driver of the motor vehicle, allowing the infotainment system to quickly connect itself with a desired mobile device to establish communication therebetween in the most energy efficient manner using a communication channel or technology most suited for the mobile device communicating with the infotainment system.

Communications System—

Figure 1:
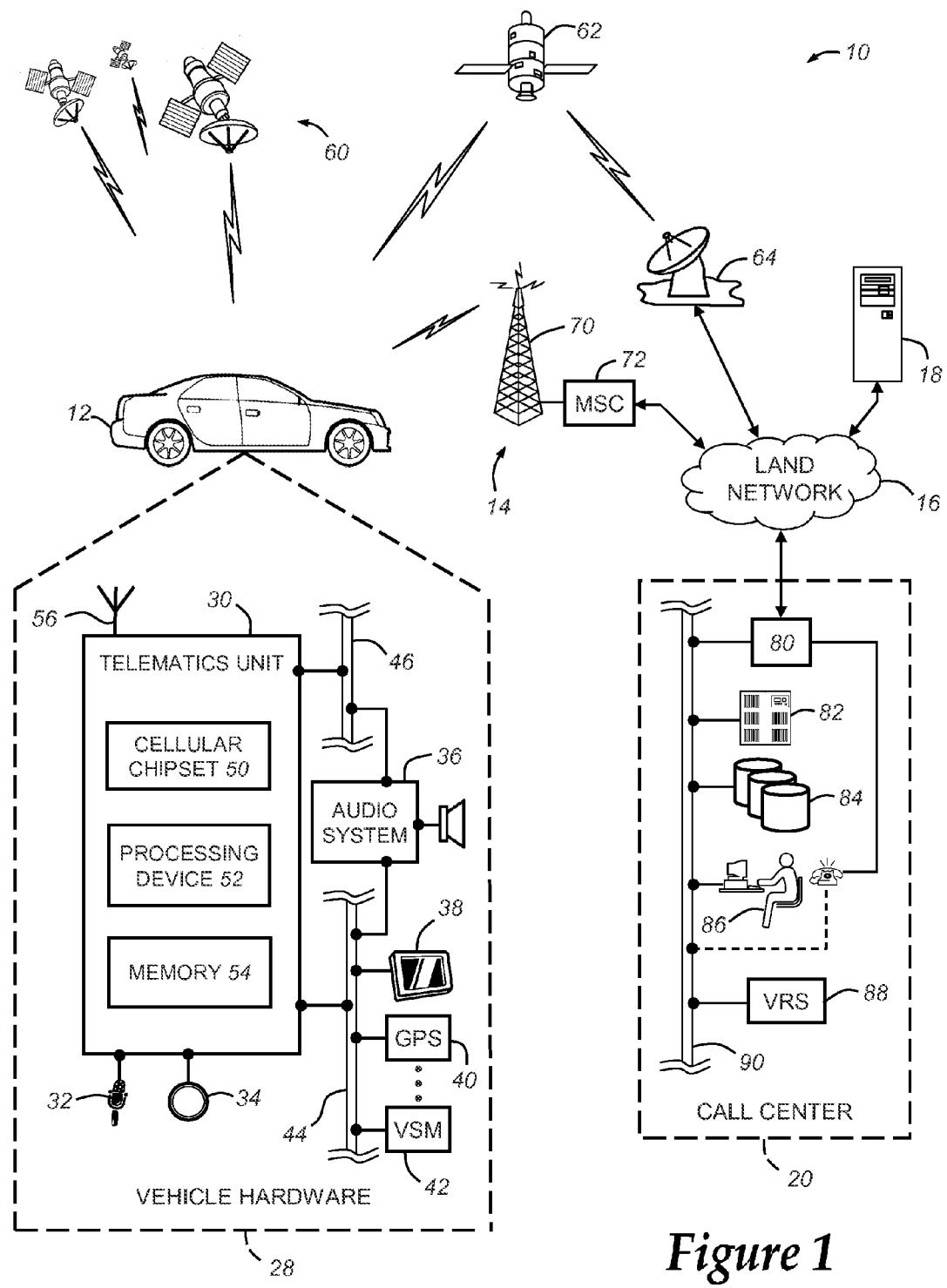
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle.

Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/ base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
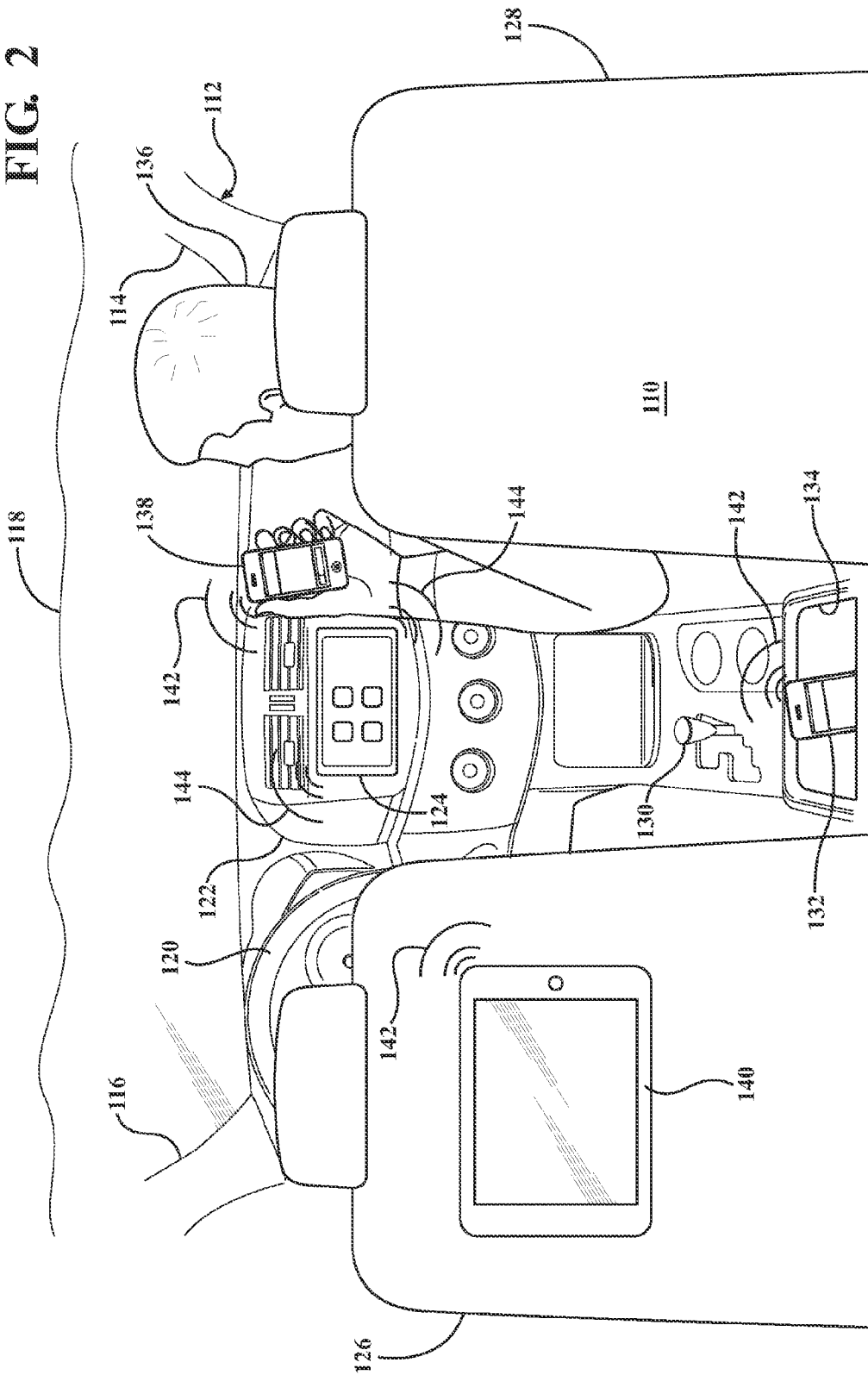
FIG. 2 is a perspective view of a passenger compartment of a motor vehicle including an infotainment system and temporarily housing a plurality of mobile devices.

Turning now to FIG. 2, a forward looking view through a passenger compartment 110 of a motor vehicle, generally indicated at 112, represented by two A pillars 114, 116, a windshield 118 (partially cut away), a steering wheel 120 and an instrument panel 122. The instrument panel 122 houses an infotainment system, graphically represented by an infotainment console 124. A driver seat 126 and passenger seat 128 are also shown. A shifter 130 allows a driver (not shown) to shift the transmission of the motor vehicle 112 to the desired driving position to transfer power from the internal combustion engine to the driven wheels (neither shown).

A driver's mobile device 132 is shown stored in a storage compartment 134 disposed between the driver seat 126 and passenger seat 128. A passenger 136 is holding a second mobile device 138 and a third mobile device 140, a tablet is graphically represented as being used by someone (not shown) sitting in a back seat (not shown) of the motor vehicle 112. Each of these mobile devices, 132, 138, 140 have internal operating devices that allow them to wirelessly communicate (graphically represented by arcuate waves) with other similarly functioning electronic devices. In addition, the infotainment system 124 emits wireless communication, represented by arcuate waves 144 to any of the mobile devices 132, 138, 140 that may be present within the passenger compartment 110 of the motor vehicle. It should be appreciated by those skilled in the art that any number of mobile devices may be present within the passenger compartment 110 in that any one occupant of the passenger compartment 110 may bring with him or her more than one mobile device that is capable of communicating wirelessly or through wires to the other mobile devices and the infotainment system 124.

Referring to FIG. 3A, a table illustrating an example of what types of mobile devices 132, 138, 140 that may be found in a passenger compartment 110 of a motor vehicle 112 is shown. Associated with each of these mobile devices 132, 138, 140 is a device name and whether the device is enabled to communicate through Bluetooth® or thorough the use of projection. Also shown is the projection technology that may support one or more mobile devices. By way of example and as is shown in FIG. 3A, some of the technologies used for projection are identified by their trademarks (e.g., Apple CarPlay, MirrorLink and Android Auto). It should be appreciated by those skilled in the art that other projection technologies may be developed and/or companies may change the trademarks associated with the projection technologies currently being offered.

Also associated with each of these mobile devices 132, 138, 140 is a priority. The priority shown in FIG. 3A is exemplary wherein the lower the priority number, the higher the priority of the mobile device 132, 138, 140. By way of example, Wen's Galaxy S4 mobile device has the highest priority in the table of mobile devices whereas Rob's HTC One device has the lowest priority. Typically, a driver or owner of the motor vehicle 112 will assign priorities to the various mobile devices that enter the passenger compartment 110 on a regular basis. In one embodiment, a driver or user of the motor vehicle 112 will store his or her priority list at a central location, such as the call center 20. The priority list may be downloaded through the telematics unit 30 to whatever motor vehicle 112 of the driver is driving. This will be particularly useful should a driver have access to a pool of vehicles and does not drive the same vehicle all the time.

Figure 3B:
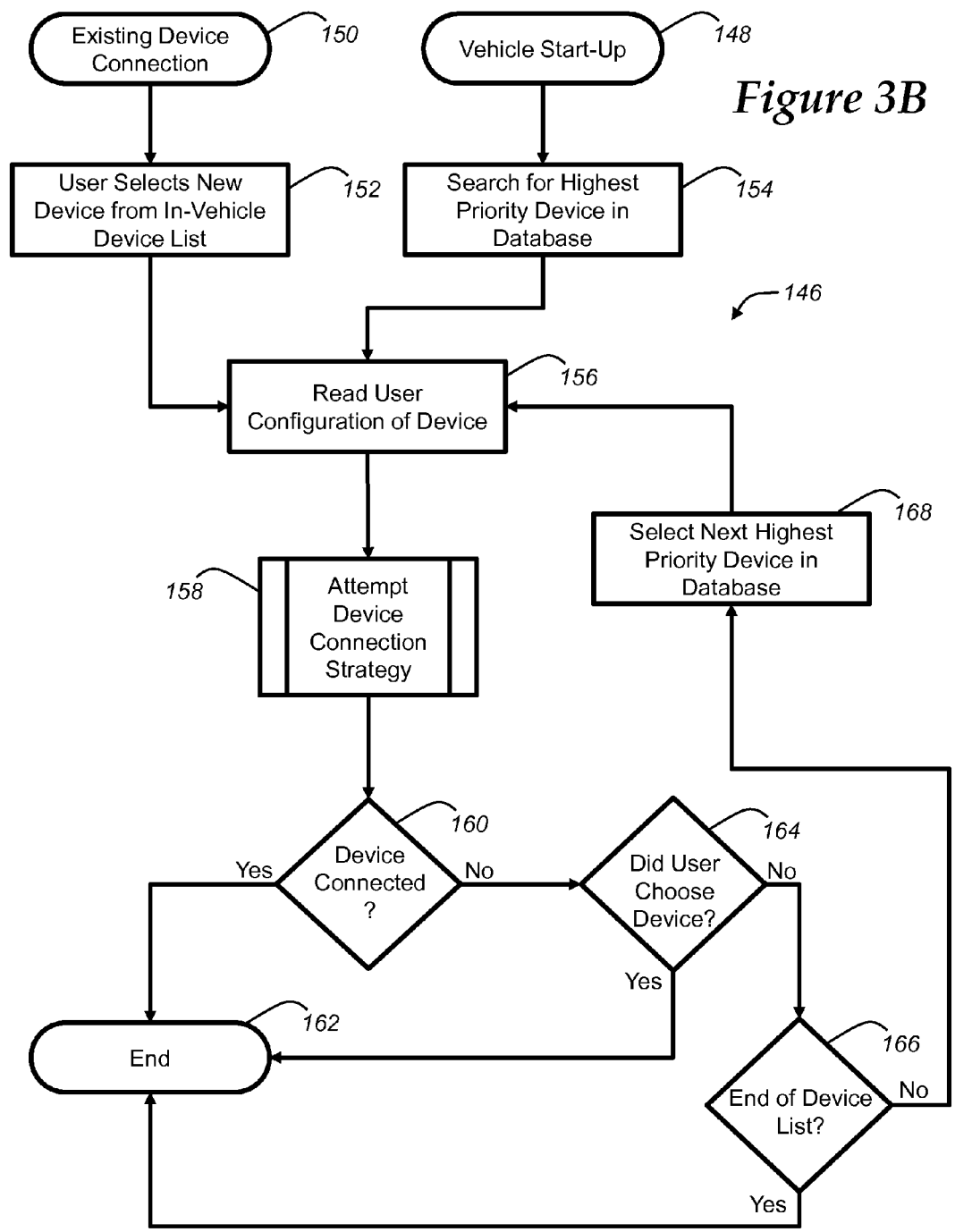
FIG. 3B is a logic chart of one embodiment of the inventive method.

Referring to FIG. 3B, one embodiment of the inventive method of initiating a communication session between one of a plurality of mobile devices 132, 138, 140 and an infotainment system 124 is generally indicated at 146. There are two alternative ways the method 146 may begin. The method 146 begins either at a vehicle start up at 148, or through an existing device connection at 150. An existing device connection 150 may be chosen when the vehicle has not been started and yet the auxiliary power has been activated due to somebody occupying the passenger compartment 110 of the motor vehicle 112 without starting the motor vehicle 112. In this instance, the user selects a new device from an in-vehicle device list at 152. If the method 146 begins at vehicle start-up 148, a search for the highest priority device in the database begins at 154. The process of searching for the highest priority device in the database begins with establishing communication with each of the plurality of mobile devices 132, 138, 140. Once communication is established with each of these mobile devices 132, 138, 140, each of the plurality of devices is identified against a predetermined priority (examples of predetermined priorities are shown in FIG. 3A), such that each of the plurality of mobile devices 132, 138, 140 identified with a predetermined priority is assigned that predetermined priority. The list of the plurality of mobile devices is then prioritized from the highest to the lowest based on that predetermined priority.

A user configuration of the mobile device with the highest priority is read at 156. From this user configuration, a connection between one of the plurality of mobile devices 132, 138, 140 with the highest priority and the infotainment system 124 of the motor vehicle 112 is attempted at 158. The actual steps of attempting device connection and the strategy behind the attempted mobile device connection is discussed in greater detail subsequently.

It is then determined at 160 as to whether a device has connected to the infotainment system 124. If so, the method 146 terminates at 162 allowing the communication between the highest priority mobile device 132, 138, 140 and the infotainment system 124. If a device was not connected, it is determined whether a user chose a mobile device 132, 138, 140 at 164. If yes, the method is terminated at 162 allowing the user chosen mobile device (step 152) to communicate directly with the infotainment center 124. If a user did not choose a device, it is then determined if the list of devices has been exhausted at 166. If yes, the method 146 is terminated with none of the mobile devices being connected to the infotainment system 124. If the device list has not been exhausted, the next highest priority mobile device 132, 138, 140 in the device list or database is selected at 168. The method then loops back to the user configuration of the device that is read at 156 in order to attempt device connection at 158.

Figure 4A:
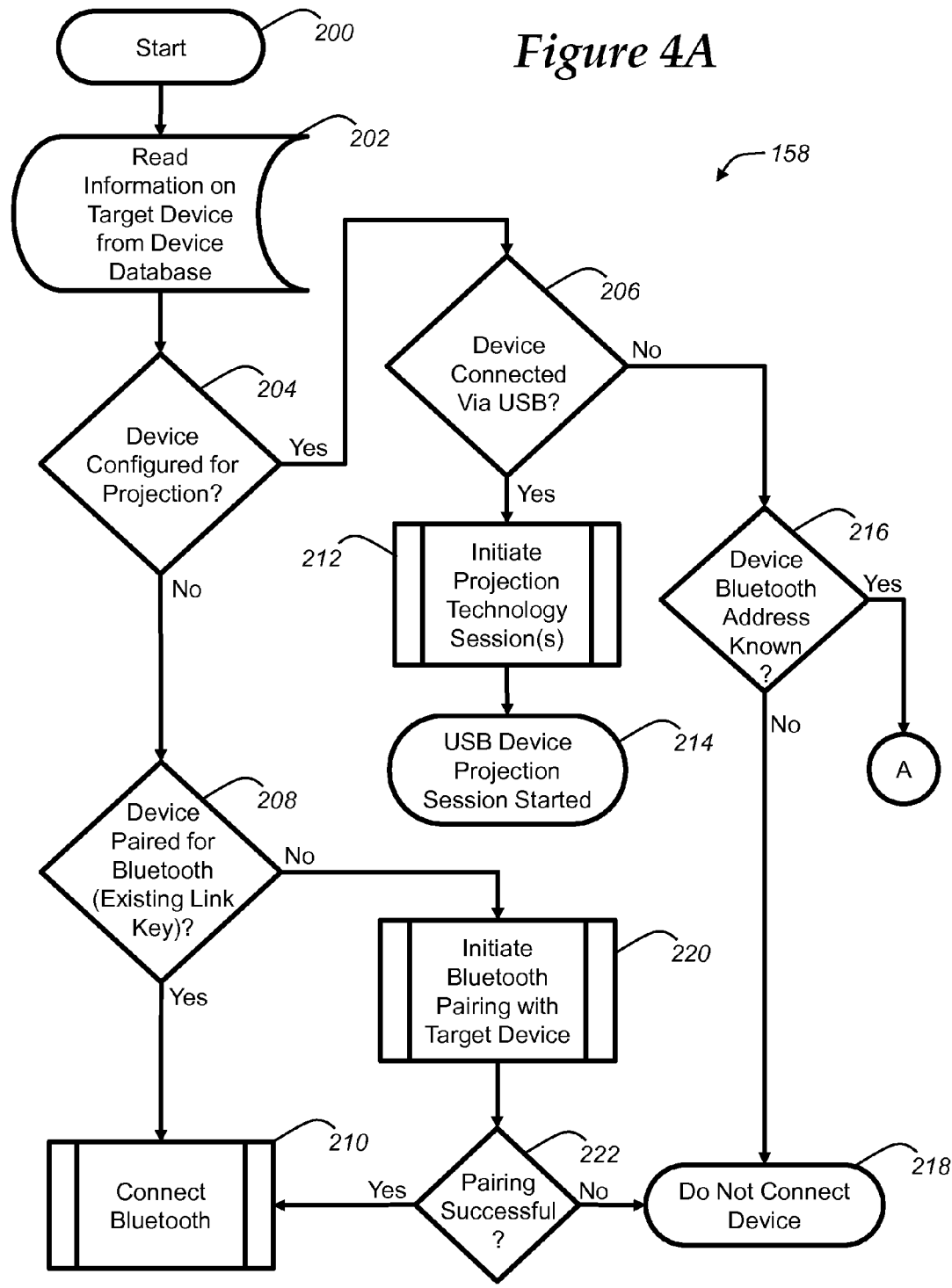
FIGS. 4A and 4B combine to form a logic chart of how the inventive method attempts device connection.
Figure 4B:
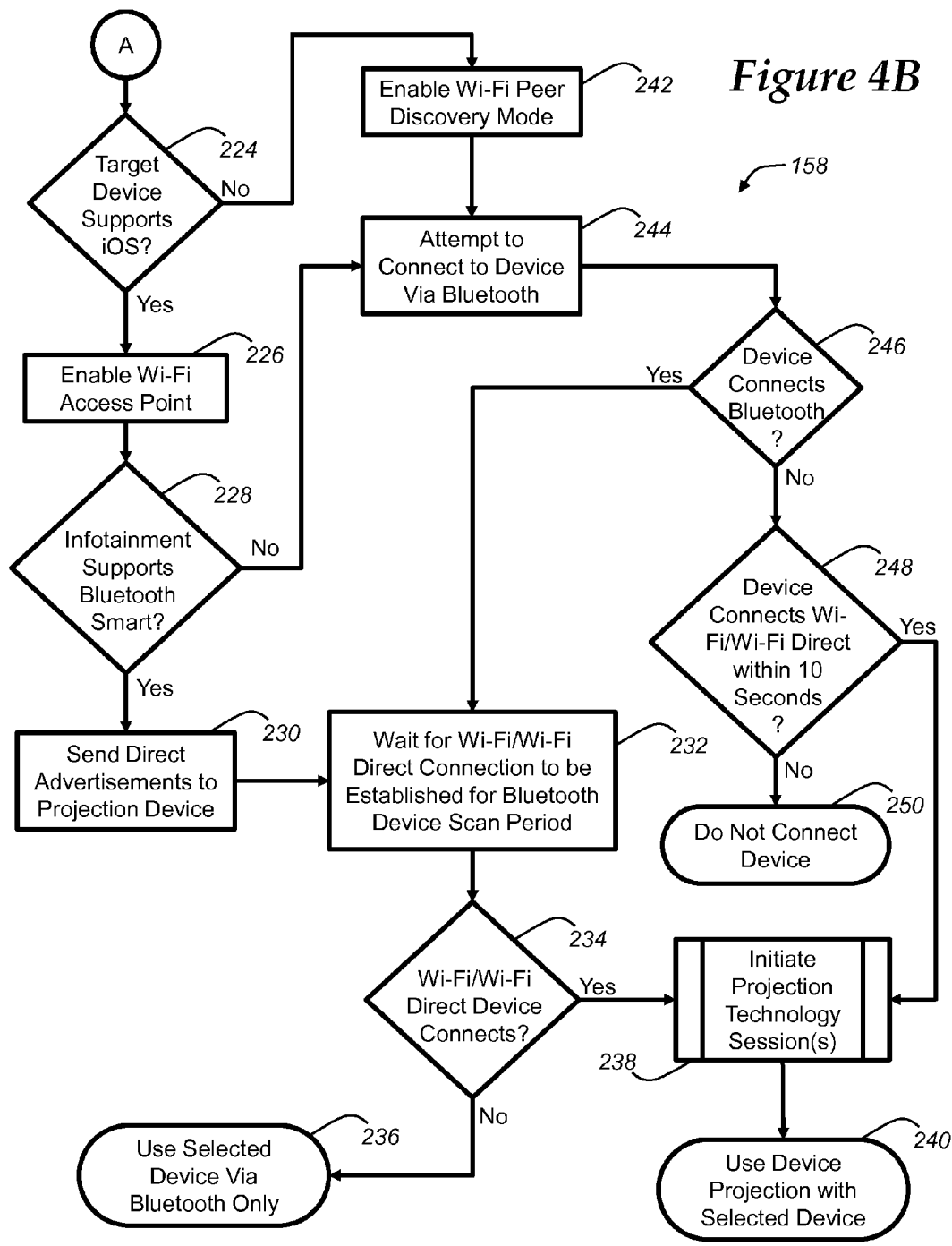

Returning our attention back to the step of attempting device connection strategy 158 (first set forth in FIG. 3B), we now turn to FIGS. 4A and 4B with circles A connecting the flow charts of FIGS. 4A and 4B together. This subroutine begins at 200.

Information on the targeted device from the device database is read at 202. The targeted device is the mobile device that has the highest priority out of all of the plurality of mobile devices. For example, the target device in the example set forth in FIG. 3A is Wen's Galaxy S4. Once the information is read, it is determined at 204 as to whether the mobile device is configured for projection or not. Continuing with the example, Wen's Galaxy S4 is configured for projection, whereas the fifth mobile device in priority, a Nexus 5, is not configured for projection—but is configured for a Bluetooth® operation.

Returning attention to FIG. 4A, if the mobile device is configured for projection, it is then determined the mobile device is connected to the infotainment center system 124 via a USB connection at 206. If the mobile device is not configured for projection, it is determined whether the mobile device is configured for Bluetooth® pairing at 208. If the mobile device is configured for a Bluetooth® pairing connection, the mobile device is connected to the infotainment system at 210 using the Bluetooth® pairing.

If it is determined at 204 that the mobile device is configured for projection, and the device is connected via USB, a projection technology session is initiated at 212. And the USB projection sessions starts at 214. If the mobile device that is configured for projection is not connected via USB, it is determined at 216 as to whether the mobile device Bluetooth® address is known. If the Bluetooth® address of the mobile device is not known, the mobile device is not connected to the infotainment system 124 at 218. This prevents that particular mobile device from being connected to the infotainment system 124 at this time.

If at 208 it is determined that the mobile device is not paired via Bluetooth®, Bluetooth® pairing with the target mobile device is initiated at 220. If the pairing is successful at 222, the mobile device is paired with the infotainment system by connecting it through Bluetooth® at 210. If not, the mobile device is not connected at 218 and the method terminates.

Continuing with the instance where the mobile device is: (a) configured for projection (204); (b) not connected via USB (206); and (c) its Bluetooth® address is known (216)—it is then determined whether the mobile device supports iOS at 224. If the target device does support iOS, its Wi-Fi access point is enabled at 226. It should be appreciated by those skilled in the art that Wi-Fi may include any short-range wireless communications protocol. Once enabled, it is determined whether the infotainment system 124 supports Bluetooth® Smart at 228. If the infotainment system 124 does support Bluetooth® Smart, direct advertisements are sent to the projecting mobile device at 230. Once the direct advertisements are sent, the system waits for Wi-Fi/Wi-Fi Direct Connection to be established for the mobile device Bluetooth® scan at 232. It is then determined at 234 whether the Wi-Fi/Wi-Fi Direct Connection occurs at 234. If it does not, the mobile device communicates with the infotainment system 124 via Bluetooth® only at 236. If the Wi-Fi/Wi-Fi Direct Connection does connect, a projection technology session is initiated at 238. The mobile device is then in a projection session with the infotainment system 124 at 240 for as long as the operator of the motor vehicle 112 chooses to use that mobile device in connection with the infotainment system 124.

Returning to decision diamond 224 in FIG. 4B, if the mobile device does not support iOS, the mobile device enables Wi-Fi Peer Discovery Mode at 242. An attempt to connect to the mobile device with the infotainment system 124 via Bluetooth® pairing occurs at 244. (This also occurs if it is determined at 228 that the infotainment system 124 does not support Bluetooth® Smart). It is then determined at 246 as to whether the mobile device has connected to the infotainment system via Bluetooth®. If so, the system waits for the Wi-Fi/Wi-Fi Direct Connection to establish for a Bluetooth® scan period at 232. If the mobile device does not connect via Bluetooth®, it is determined whether the mobile device connects via Wi-Fi/Wi-Fi Direct Connection within ten seconds at 248. If the mobile device does not connect via Wi-Fi/Wi-Fi Direct Connection, the mobile device is not connected to the infotainment system at 250. If the mobile device does connect via Wi-Fi/Wi-Fi Direct Connection, a projection technology session is initiated at 238 and the mobile device enters into a projection session with the infotainment system at 240.

As stated above, once the subroutine 200 cycles through the attempts to connect with the one of the plurality of mobile devices with the highest priority, it then cycles back through and starts the subroutine 200 with the mobile device with the next highest priority. And it continues this process until it connects with a mobile device or runs out of detected mobile devices that have an established priority.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for initiating a projection session between one of a plurality of mobile devices and an infotainment system of a motor vehicle, the method comprising the steps of:
    establishing communications with each of the plurality of mobile devices;
    identifying each of the plurality of devices against a predetermined priority such that each of the plurality of devices identified with a predetermined priority is assigned the predetermined priority;
    prioritizing each of the plurality of devices from highest to lowest based on the predetermined priority;
    reading a projection configuration of the one of the plurality of devices with the highest priority;
    attempting a connection between the one of the plurality of devices with the highest priority and the infotainment system of the motor vehicle based on the projection configuration; and
    establishing a communications session between the one of the plurality of devices with the highest priority and the infotainment system of the motor vehicle.

2. A method as set forth in claim 1 wherein the step of attempting connection includes the step of projecting the communications session between the one of the plurality of devices with the highest priority and the infotainment system of the motor vehicle.

3. A method as set forth in claim 2 wherein the step of attempting connection includes the step of pairing via Bluetooth® the one of the plurality of devices with the highest priority to the infotainment system of the motor vehicle should the step of projecting the communication session fail.

4. A method as set forth in claim 3 wherein the step of attempting connection includes the step of linking via a short-range wireless communications protocol the one of the plurality of devices with the highest priority to the infotainment system of the motor vehicle should the step of pairing the communications session fail.

5. A method as set forth in claim 4 including the step of terminating the step of attempting connection with the one of the plurality of devices with the highest priority after the step of linking has failed.

6. A method as set forth in claim 5 including the step of attempting connection between one of the plurality of devices with a next highest priority and the infotainment system of the motor vehicle.

7. A method as set forth in claim 1 including the step of downloading a predetermined priority from a telematics unit.

8. A method for initiating a projection session between one of a plurality of mobile devices and an infotainment system of a motor vehicle, the method comprising the steps of:
- establishing communications with each of the plurality of mobile devices by pairing with each of the plurality of mobile devices via Bluetooth®;
- identifying each of the plurality of devices against the predetermined priority such that each of the plurality of devices identified with a predetermined priority is assigned the predetermined priority;
- prioritizing each of the plurality of devices from highest to lowest based on the predetermined priority;
- reading a projection configuration of the one of the plurality of devices with the highest priority;
- attempting a connection between the one of the plurality of devices with the highest priority and the infotainment system of the motor vehicle based on the projection configuration by linking the one of the plurality of devices and the infotainment system via a short-range wireless communications protocol; and
- establishing a short-range wireless projection communications session between the one of the plurality of devices with the highest priority and the infotainment system of the motor vehicle.

9. A method as set forth in claim 8 wherein the step of establishing a short-range wireless projection communications session includes the step of pairing via Bluetooth® the one of the plurality of devices with the highest priority to the infotainment system of the motor vehicle should the short-range wireless projection communications session fail.

10. A method as set forth in claim 9 including the step of terminating the step of attempting connection with the one of the plurality of devices with the highest priority after the step of linking has failed.

11. A method for initiating a projection session between one of a plurality of mobile devices and an infotainment system of a motor vehicle, the method comprising the steps of:
- establishing communications with each of the plurality of mobile devices;
- identifying each of the plurality of devices against a predetermined priority such that each of the plurality of devices identified with a predetermined priority is assigned the predetermined priority;
- prioritizing each of the plurality of devices from highest to lowest based on the predetermined priority;
- reading a projection configuration of the one of the plurality of devices with the highest priority;
- attempting a connection between the one of the plurality of devices with the highest priority and the infotainment system of the motor vehicle based on the projection configuration;
- establishing a communications session between the one of the plurality of devices with the highest priority and the infotainment system of the motor vehicle;
- determining whether the one of the plurality of devices is configured to project; and
- establishing communications between the one of the plurality of devices with the highest priority and the infotainment system of the motor vehicle by electrically connecting the one of the plurality of devices directly to the infotainment system.

* * * * *